Patented Mar. 14, 1933                           1,901,354

UNITED STATES PATENT OFFICE

KURT MEISENBURG, OF LEVERKUSEN-ON-THE-RHINE, GERMANY, ASSIGNOR TO I. G. FARBENINDUSTRIE AKTIENGESELLSCHAFT, OF FRANKFORT-ON-THE-MAIN, GERMANY

MIXED RUBBER-LIKE MASSES AND PROCESS OF PREPARING SAME

No Drawing. Application filed January 16, 1931, Serial No. 509,280, and in Germany January 20, 1930.

The present invention relates to a process of preparing mixed rubberlike masses from mixtures of butadiene hydrocarbons and unsaturated ketones and to the new mixed polymerizates obtainable by said process.

In the polymerization of butadiene hydrocarbons, such as butadiene-(1.3), isoprene or 2.3-dimethyl-butadiene-(1.3) to rubberlike masses, products are obtained in many cases, which give a sheet on the rollers and take up fillers only with difficulty. In particular butadiene hydrocarbons polymerized in aqueous emulsion generally show these disadvantageous properties.

In accordance with the present invention polymerization products of valuable rubberlike properties and of excellent softness and plasticity are obtained by effecting the polymerization of the butadiene hydrocarbons in admixture with unsaturated ketones of the general formula

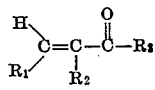

wherein $R_1$ denotes hydrogen or an alkyl group or an aryl group of the benzene series, $R_2$ means hydrogen or an alkyl group, and $R_3$ an alkyl group or an aryl group of the benzene series.

The ketones should be applied in an amount between about 5-50% by weight (calculated on the butadiene hydrocarbon-ketone mixture). Polymerization is effected either by simply heating the mixture, for example, to a temperature between 30–150° C., or by polymerizing the mixture in emulsion with water and an agent possessing emulsifying properties, such as water soluble salts of higher fatty acids, for example, sodium oleate, potassium stearate, alkali metal- or ammonium-salts of cholic acid, desoxycholic acid and furthermore, alkylated naphthalene sulfonic acids, such as isopropyl- or isobutyl-naphthalene sulfonic acids, salts of organic bases with organic or inorganic acids possessing emulsifying properties, such as diethyl-amino-ethyl-oleylamide-chlorohydrate or -acetate, the methylamine salt of oleic acid or cholic acid, the chlorohydrate of μ-penta-decylglyoxalidine, albumine, caseine, blood serum etc. Also in this case heating of the emulsion to about 30–150° C. is advantageous in accelerating the polymerization process, and, furthermore, the emulsions may be homogenized before the polymerization. Obviously, ingredients known to favorably influence polymerization processes of the kind above referred to, such as oxygen, substances splitting off oxygen during polymerization, electrolytes etc. may be added to the mixture to be polymerized before or during polymerization. Likewise other polymerizable compounds, more particularly olefine benzenes, such as styrol, divinylbenzenes etc. may be added to the butadiene hydrocarbon-ketone mixture in many cases with a good effect.

The polymerization products thus obtainable give an excellent sheet on the rollers and take up fillers very readily, especially in case that butadiene and/or isoprene have been applied as the butadiene hydrocarbon component of the mixture to be polymerized. The polymerization products can be vulcanized according to the customary methods and yield, especially in case carbon black has been incorporated within the polymerizates, excellent soft or hard rubber like vulcanization products. The good resistance to abrasion of the resulting soft rubberlike products should be particularly mentioned.

The following examples illustrate the invention without limiting it thereto:—

*Example 1.*—8,3 parts by weight of butadiene-(1.3) and 2,52 parts by weight of methyl-methylene-ethyl-ketone are agitated at 60° C. for several days with 8 parts by weight of a 3% aqueous solution of the hydrochloride of diethylamino-ethoxyoleyl-anilide. A polymerization product is obtained in a quantitative yield, which becomes soft and plastic on the rollers and yields a valuable vulcanization product.

*Example 2.*—8,5 parts by weight of butadiene-(1.3), 2,52 parts by weight of methyl-methylene-ethylketone and 0,21 part by weight of magnesium oleate are agitated at 60° C. for several days with 7 parts by weight of a 10% aqueous solution of sodium oleate.

The resulting polymerization product gives an excellent sheet on the rollers and yields valuable vulcanization products.

*Example 3.*—5,75 parts by weight of butadiene-(1.3) and 2,21 parts by weight of benzal-acetone are agitated at 60° C. for several days with 7 parts by weight of an aqueous solution of the hydrochloride of diethyl-amino-ethoxyoleyl-anilide of 3% strength. The polymerization product readily takes up fillers on the rollers and can be vulcanized to soft or hard rubberlike products.

*Example 4.*—7 parts by weight of butadiene-(1.3), 2.5 parts by weight of benzal-acetone, and 0,5 part by weight of methyl-methylene-ethylketone are agitated at 60° C. for several days with 7 parts by weight of a 3% aqueous solution of diethylamino-ethoxyoleyl-anilide. A polymerizate is obtained in almost quantitative yield, yielding a vulcanization product of good tensile strength.

*Example 5.*—A mixture of 25 parts by weight of butadiene-(1.3) and 25 parts by weight of methyl-methylene-ethylketone is heated to 60° C. for about three weeks. A mixed polymerizate is thus obtained in a yield of 75% of theory, being easily workable on rollers and yielding high grade vulcanization products.

Instead of the ketones applied in the above examples other ketones of the general formula given, such as methyl-vinyl-ketone, vinyl-phenyl-ketone, ethylideneacetone etc. may be employed.

I claim:—

1. Process which comprises heating a mixture of a butadiene hydrocarbon and of a ketone of the general formula

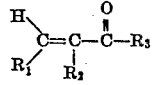

wherein $R_1$ denotes hydrogen or an alkyl group or an aryl group of the benzene series, $R_2$ means hydrogen or an alkyl group, and $R_3$ an alkyl group or an aryl group of the benzene series, said mixture containing the ketone in an amount between about 5–50% by weight (calculated on the butadiene hydrocarbon-ketone mixture), to a temperature between about 30–150° C., until polymerization is complete.

2. Process which comprises heating a mixture of a butadiene hydrocarbon of the formula $$CH_2=C-C=CH_2$$
$$\quad\ \ |\ \ \ |$$
$$\quad\ \ H\ \ \ x$$

wherein $x$ means hydrogen or methyl, and of a ketone of the general formula

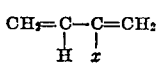

wherein $R_1$ denotes hydrogen or an alkyl group or an aryl group of the benzene series, $R_2$ means hydrogen or an alkyl group, and $R_3$ an alkyl group or an aryl group of the benzene series, said mixture containing the ketone in an amount between about 5–50% by weight (calculated on the butadiene hydrocarbon-ketone mixture), to a temperature between about 30–150° C., until polymerization is complete.

3. Process which comprises heating a mixture of a butadiene hydrocarbon and of a ketone of the general formula

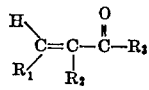

wherein $R_1$ denotes hydrogen or an alkyl group or an aryl group of the benzene series, $R_2$ means hydrogen or an alkyl group, and $R_3$ an alkyl group or an aryl group of the benzene series, said mixture containing the ketone in an amount between about 5–50% by weight (calculated on the butadiene-hydrocarbon-ketone mixture), in emulsion with water and an agent possessing emulsifying properties, to a temperature between about 30–150° C., until polymerization is complete.

4. Process which comprises heating a mixture of a butadiene hydrocarbon of the formula $$CH_2=C-C=CH_2$$
$$\quad\ \ |\ \ \ |$$
$$\quad\ \ H\ \ \ x$$

wherein $x$ means hydrogen or methyl, and of a ketone of the general formula

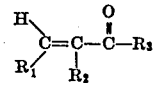

wherein $R_1$ denotes hydrogen or an alkyl group or an aryl group of the benzene series, $R_2$ means hydrogen or an alkyl group, and $R_3$ an alkyl group or an aryl group of the benzene series, said mixture containing the ketone in an amount between about 5–50% by weight (calculated on the butadiene-hydrocarbon-ketone mixture), in emulsion with water and an agent possessing emulsifying properties, to a temperature between about 30–150° C., until polymerization is complete.

5. Process which comprises heating a mixture of butadiene-(1.3) and of a compound of the group consisting of methyl-methylene-ethylketone and benzal-acetone, said mixture containing the ketone in an amount between about 5–50% by weight (calculated on the butadiene hydrocarbon-ketone mixture), to a temperature between about 30–150° C., until polymerization is complete.

6. Process which comprises heating a mixture of butadiene-(1.3) and of a compound of the group consisting of methyl-methylene-ethylketone and benzal-acetone, said mixture containing the ketone in an amount between about 5-50% by weight (calculated on the butadiene hydrocarbon-ketone mixture), in emulsion with water and an agent possessing emulsifying properties, to a temperature between about 30-150° C., until polymerization is complete.

7. Process which comprises polymerizing a mixture of butadiene-(1.3) and methyl-methylene-ethylketone, said mixture containing the ketone in an amount between about 5-50% by weight (calculated on the butadiene-ketone mixture), in emulsion with water and an agent possessing emulsifying properties, at a temperature of about 60° C.

8. The mixed polymerizates obtainable according to the process claimed in claim 1, said polymerizates being easily workable on rollers, easily taking up fillers and yielding high grade soft or hard rubber-like vulcanization products.

9. The mixed polymerizates obtainable according to the process claimed in claim 2, said polymerizates being easily workable on rollers, easily taking up fillers and yielding highgrade soft or hard rubber-like vulcanization products.

10. The mixed polymerizates obtainable according to the process claimed in claim 3, said polymerizates being easily workable on rollers, easily taking up fillers and yielding high grade soft or hard rubber-like vulcanization products.

11. The mixed polymerizates obtainable according to the process claimed in claim 4, said polymerizates being easily workable on rollers, easily taking up fillers and yielding high grade soft or hard rubber-like vulcanization products.

12. The mixed polymerizates obtainable according to the process claimed in claim 7, said polymerizates being easily workable on rollers, easily taking up fillers and yielding high grade soft or hard rubber-like vulcanization products.

In testimony whereof, I affix my signature.

KURT MEISENBURG.